(12) United States Patent
Ma

(10) Patent No.: US 6,722,891 B1
(45) Date of Patent: Apr. 20, 2004

(54) MAGNETIC DRAWING BOARD APPARATUS

(75) Inventor: Philip Ma, Coquitlam (CA)

(73) Assignee: Goldlok Toys Manufactory Co., Ltd., Hong Kong (HK)

( * ) Notice: Subject to any disclaimer, the term of this patent is extended or adjusted under 35 U.S.C. 154(b) by 0 days.

(21) Appl. No.: 10/385,710

(22) Filed: Mar. 12, 2003

(51) Int. Cl.[7] .................................................. B43L 1/00
(52) U.S. Cl. ........................ 434/409; 434/408; 434/85; 40/621
(58) Field of Search .......................... 434/85, 408, 409; 40/621

(56) References Cited

U.S. PATENT DOCUMENTS

| | | | |
|---|---|---|---|
| 4,143,472 A | | 3/1979 | Murata et al. |
| 4,675,476 A | * | 6/1987 | Kobayashi ................ 345/173 |
| 5,163,846 A | * | 11/1992 | Lee ............................. 434/408 |
| 5,186,631 A | | 2/1993 | Okutsu |
| 5,820,385 A | | 10/1998 | Ohashi et al. |
| 5,997,309 A | | 12/1999 | Metheny et al. |
| 6,370,720 B1 | * | 4/2002 | Jang .............................. 15/98 |
| 6,416,329 B1 | * | 7/2002 | Hirota et al. ................ 434/409 |
| 6,517,355 B1 | * | 2/2003 | Long et al. .................. 434/409 |

* cited by examiner

Primary Examiner—Derris H. Banks
Assistant Examiner—Dmitry Suhol
(74) Attorney, Agent, or Firm—Burns, Doane, Swecker & Mathis, L.L.P.

(57) ABSTRACT

A magnetic drawing apparatus including image forming means, image erasing means, motion generating means, movement control means and a main housing, wherein:

- the image forming means include a plurality of magnetic cells which collectively define an image forming surface, the magnetic cell contains a viscous fluid and magnetic powder;
- the image erasing means include a magnetic image eraser which is adjacent to the image forming means, the magnetic image eraser is connected to the motion generating means and is movable relative to the image forming means; and
- the movement control means include means for actuating the motion generating means and means for selecting the direction of movement of the magnetic image eraser with respect to the image forming means.

16 Claims, 4 Drawing Sheets

MAGNETIC DRAWING BOARD APPARATUS

FIELD OF THE INVENTION

The present invention relates to image forming apparatus and, more particularly, to erasable image forming apparatus. More specifically, although of course not solely limited thereto, this invention relates to magnetic drawing apparatus or magnetic drawing boards including toy magnetic drawing boards.

BACKGROUND OF THE INVENTION

Pictures, drawings and graphics are an effective means of communication and convenient means for expressing ideas and creativities. Drawing apparatus are generally used for making drawings, sketches, pictures and graphics or even writing. In many applications, erasable drawing apparatus such as erasable drawing boards are particularly useful for jotting down initial thoughts, random ideas or sketches before a more pertinent form of record is desirable. Erasable drawing apparatus are also useful in children education since young children can feel free to express themselves without fear of being laughed at subsequently as the images formed on the drawing apparatus can be easily wiped off.

Magnetic image forming apparatus such as magnetic drawing apparatus or magnetic drawing boards are a well known form of erasable drawing apparatus. A typical magnetic drawing board includes a magnetic image forming surface which is formed by an ensemble of closely placed image forming cells or micro capsules. The image forming cells or micro capsules are filled with a viscous fluid and an image forming powder. The image forming powder generally includes photoabsorptive ferro magnetic powder which is dispersed in the viscous fluid. In some applications, non-magnetic photoreflective powder is also dispersed in the viscous fluid and mixed with the photo absorptive magnetic powder for enhanced drawing quality. A pen with a magnetic tip is usually used to form images or drawings on the magnetic image forming surface by moving the magnetic pen with its magnetic tip touching the image forming surface. The magnetic attraction of the tip of the magnetic pen will attract the photoabsorptive magnetic powder and form dark traces which collectively form a drawing or an image. To erase the image, a magnetic eraser is usually used to wipe on the image forming surface so as to move the photoabsorptive magnetic powder away from the image forming surface. Magnetic attraction or repulsion of the magnetic powder can be used to drive the magnetic powder away from the image forming surface to reset. A well known type of such magnetic drawing board is described in U.S. Pat. No. 4,143,472.

Although magnetic drawing boards of the above-mentioned description have been known for over 20 years, it is noted that the magnetic drawing boards available today still bear a remarkable resemblance to the original version which comprises a plastic main housing on which there is mounted a magnetic image forming member and a magnetic eraser, although substantial cosmetic changes have been introduced to the rigid main housing and better quality magnetic image forming members are now available. As more and more new toys or educational aids with more interesting features are becoming available every day, it will be appreciated that erasable magnetic drawing apparatus of the above description should be equipped with new features which are useful and attractive to the users, especially the younger users, in order to maintain or regain its popularity. In particular, it will be highly desirable if magnetic drawing apparatus are provided with novel features which facilitate some form of interaction between the user and the apparatus to make using the drawing apparatus a more enjoyable exercise.

OBJECT OF THE INVENTION

Hence, it is an object of the present invention to provide magnetic drawing apparatus with novel features which are useful and interesting to the users, especially the young users. More particularly, it is an object of this invention to provide a toy magnetic drawing board with novel means and features which are useful and interesting to attract user attention. More specifically, although of course not solely limited to, it is an object of the present invention to provide magnetic drawing apparatus with means and features to facilitate interaction between the user and the apparatus to make the use of the apparatus more enjoyable. At a minimum, it is an object of the present invention to provide the public with a useful choice of magnetic drawing apparatus with novel features.

SUMMARY OF THE INVENTION

According to a first aspect of the present invention, there is provided a magnetic drawing apparatus including image forming means, image erasing means, motion generating means, movement control means and a main housing, wherein:

said image forming means include a plurality of magnetic cells which collectively define an image forming surface, said magnetic cell contains a viscous fluid and magnetic powder;

said image erasing means include a magnetic image eraser which is adjacent to said image forming means, said magnetic image eraser is connected to said motion generating means and is movable relative to said image forming means to erase an image on said image forming means; and said movement control means include means for actuating and controlling said motion generating means to erase an image.

According to a preferred embodiment of the present invention, there is provided a toy drawing board including image forming means, image erasing means, motion generating means, motion indication means, sound generation means, movement control means and a main housing, wherein:

said image forming means include a plurality of magnetic cells which collectively define an image forming surface, said magnetic cell contains a viscous fluid and magnetic powder;

said image erasing means include a magnetic image eraser which is adjacent to said image forming means, said magnetic image eraser is connected to said motion generating means and is movable relative to said image forming means;

said motion indication means includes a visible indicia which is indicative, representative or characteristic of an object, the audible sound generated by said audible signal generating means being indicative, representative or characteristic of said object;

said sound generation means generates audible sound during the movement of said magnetic image eraser; and said movement control means include means for actuating said motion generating means and means for selecting the direction of movement of said magnetic image eraser with respect to said image forming means.

Preferably, said movement control means include means for selecting the direction of movement of said magnetic image eraser with respect to said image forming means.

Preferably, said drawing board or apparatus further including a visible motion indication means, said motion indication means being movable in synchronization with said magnetic image eraser.

Preferably, said drawing board or apparatus further including an audible sound generating means, said audible signal generating means generates audible sound during the movement of said magnetic image eraser.

Preferably, said motion indication means includes a visible indicia which is indicative, representative or characteristic of an object, the audible sound generated by said audible signal generating means being indicative, representative or characteristic of said object.

Preferably, said object includes a vehicle such as a train, said audible sound being the characteristic sound associated with the movement of said vehicle.

Preferably, said visible motion indication means includes a visible indicia of an object which has a commonly recognized direction of movement with reference to a direction indicator of said visible indicia, said visible indicia being movable along a pre-defined track formed on said main housing.

Preferably, said drawing board and apparatus further including means for changing the orientation of said direction indicator at the extremes of said track.

Preferably, said movement control means include means for selectively changing the direction of movement of said magnetic image eraser along said track when said visible indicia is located intermediate between the ends of said track.

Preferably, said motion generating means include a motorized driving mechanism, said motorized driving mechanism includes a motor and a set of geared transmission link, said magnetic image eraser being mounted with said motorized driving mechanism and said geared transmission link being engageable with said main housing so that motion of the motor will be translated into movements of said magnetic image eraser through engagement between said transmission link and said main housing.

Preferably, said movement control means include a user control interface which is visible and accessible to a user for user control and selection of the movement of said magnetic image eraser.

Preferably, said user control interface includes means to control the duration of movement of said magnetic image eraser.

Preferably, said drawing board including an image forming device, said image forming device includes a cylindrical drum with image forming magnetic patterns formed on the curved cylindrical surface of said drum.

Preferably, said image forming device further includes a handle with a shaft for engaging and driving the rotation of said drum.

BRIEF DESCRIPTION OF THE DRAWINGS

A preferred embodiment of an image forming apparatus of the present invention in the form of a magnetic drawing apparatus will be explained in further detail by way of example and with reference to the accompanying drawings, in which.

DETAILED DESCRIPTION OF THE PREFERRED EMBODIMENTS

Figure 1:
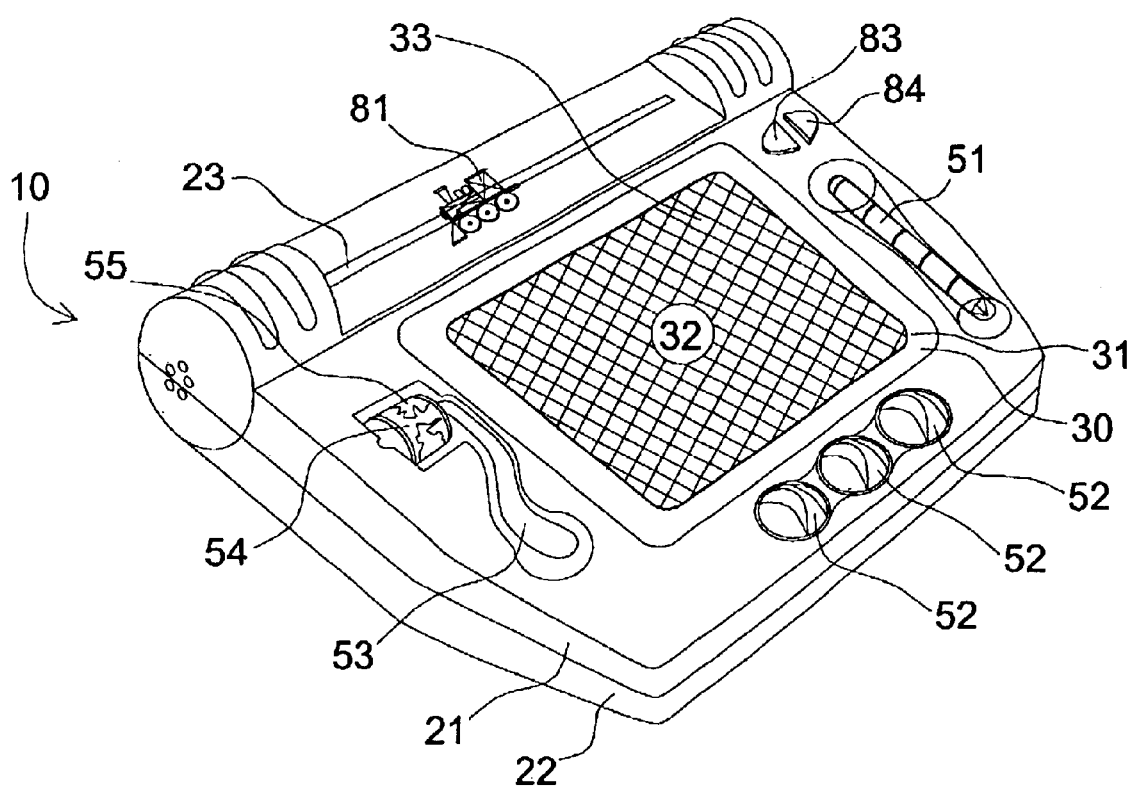
FIG. 1 is a top perspective view showing a preferred embodiment of a magnetic drawing apparatus of the present invention.
Figure 2:
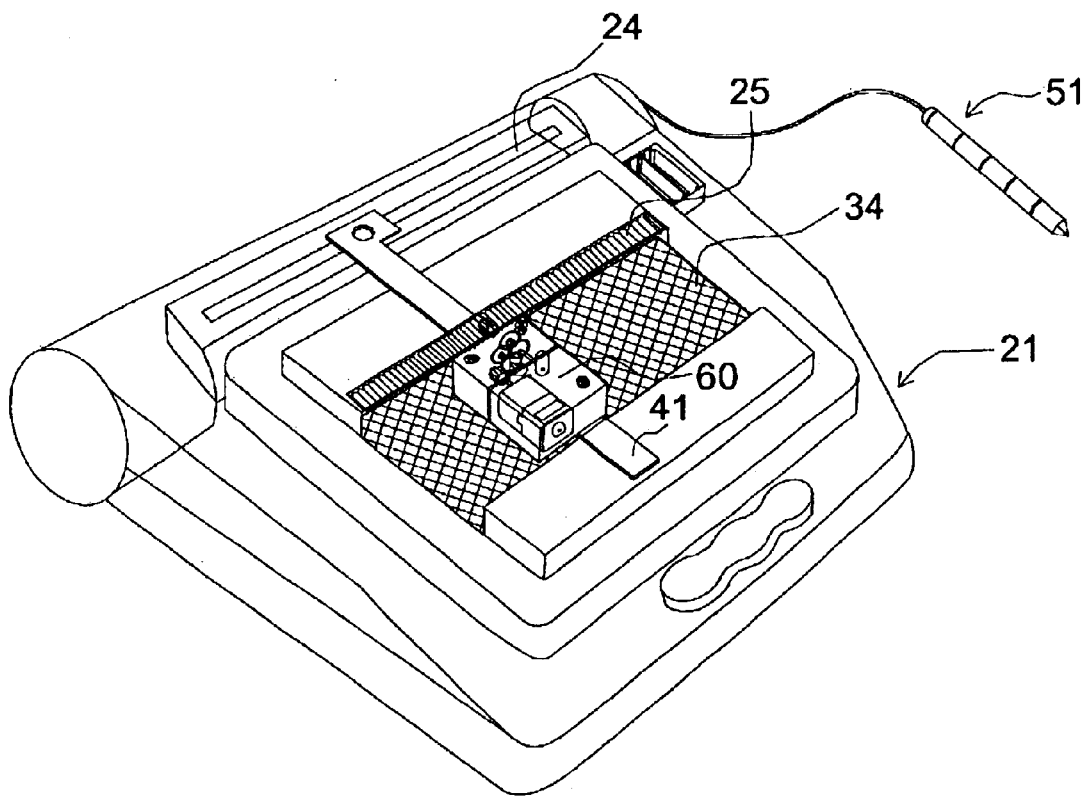
FIG. 2 is a perspective view from the bottom of the magnetic drawing apparatus of FIG. 1 with the bottom housing detached.
Figure 3:
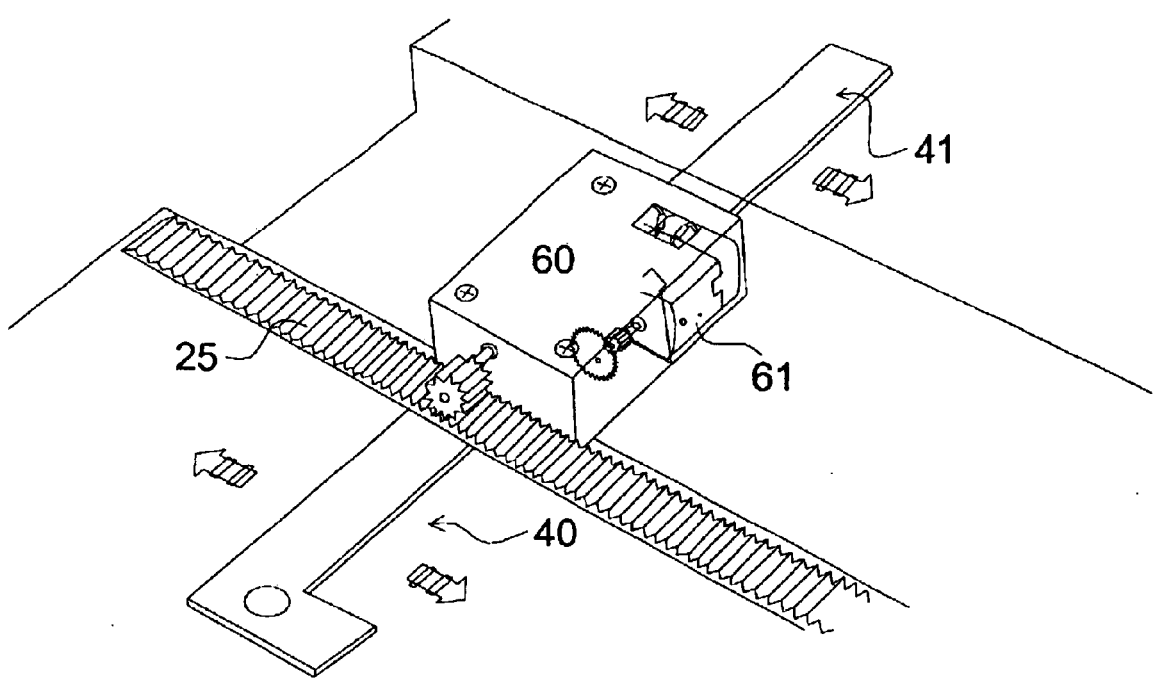
FIG. 3 is an enlarged perspective view illustrating in more detail the motion generating means incorporated in the embodiment of FIG. 2, and FIGS. 4A and 4B respectfully illustrate schematically the rear and side views of the motion generating means and the image erasing means with respect to the image forming member.
Figure 4A:
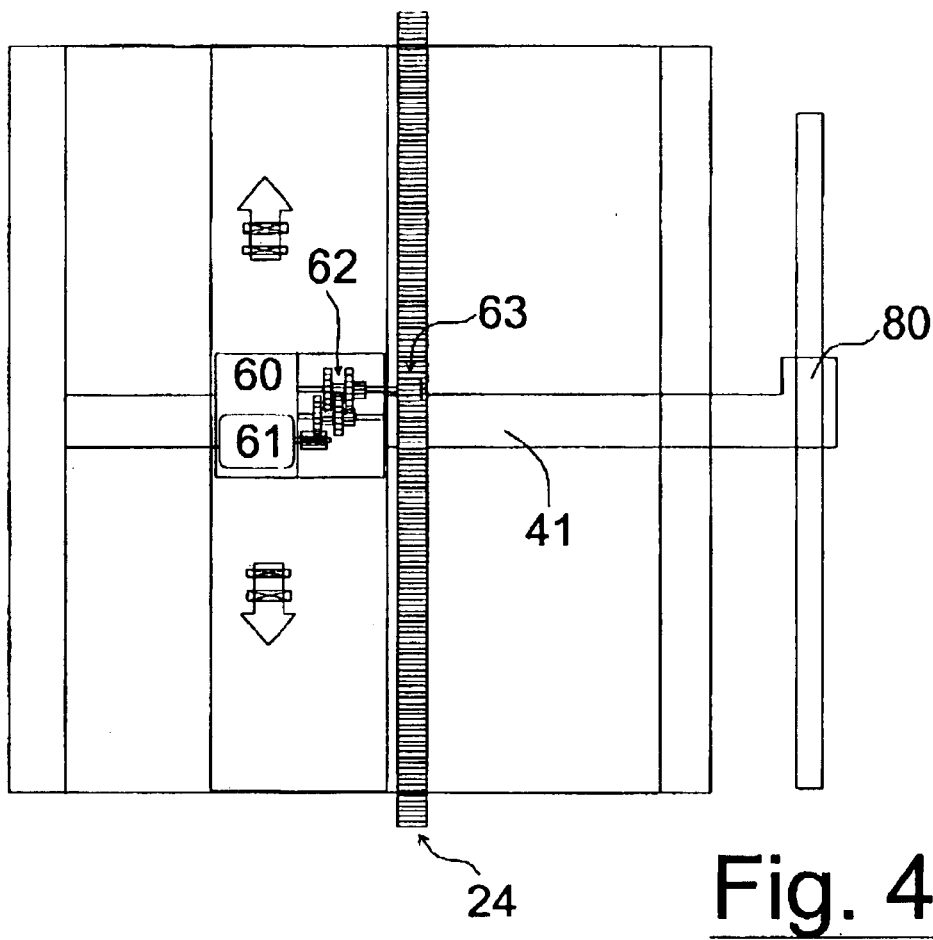
Figure 4B:
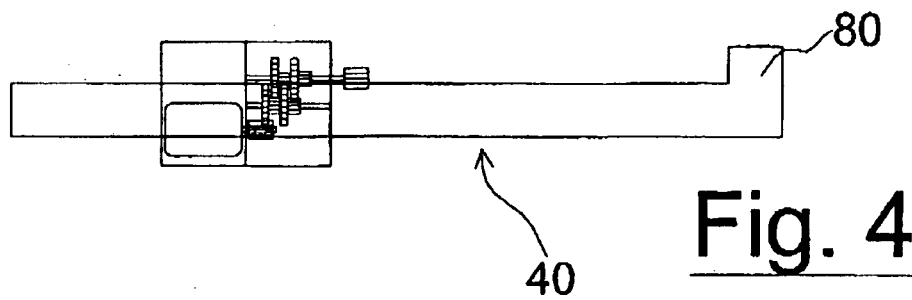

A preferred embodiment of the invention of an image forming apparatus in the form of a magnetic drawing apparatus is shown in the Figures. Referring firstly to FIGS. 1 to 3, the magnetic drawing apparatus 10 generally includes a main housing 20, image forming means 30, image erasing means 40, motion generating means and movement control means. In addition, it also includes a visible motion indication means and an audible signal generating means.

Also, a magnetic pen 51 with a magnetic drawing tip as well as a plurality of magnetic stamps 52, with magnetic patterns formed on their bottom surfaces are also provided as a convenient means for forming image on the apparatus. In addition, an image forming roller 53 is included as an additional drawing aid so that a plurality of images can be formed by rolling a single drawing tool.

The image forming roller 53 includes a drum 54 with a plurality of magnetic shapes or patterns 55 formed on its cylindrical cave surface. The drum 54 includes an axially extending aperture for receiving the driving shaft of the handle portion of the image forming roller 53. The main housing 20 includes a top housing part 21 and a bottom housing part 22 which are connected together by, for example, fastening means such as screws. The top housing 21 includes an aperture for receiving the image forming member 31 of the image forming means 30 as well as providing a track 23 along which the visible motion indication means can move. In addition, a plurality of preformed depressions are also formed on the top surface of the top housing 21 for accommodating the various image forming aids including the magnetic pen 51, the stamp 52 and the image forming roller 53. The image forming means includes an image forming member 31 on which there is mounted an image forming surface 32. The image forming member 31 include a plurality of magnetic cells 33 or micro capsules which collectively define the image forming surface 32.

The magnetic cells contain a dispersing medium and imaging forming medium. The dispersing medium is generally a viscous fluid which can be, for example, a plastic or an oily liquid. The image forming medium contains a photoabsorptive magnetic powder. A non-magnetic, photoreflective, powder can also be added to the image forming medium to enhance drawing effects. The magnetic cells are generally arranged in a matrix form and comprises a plurality of closely and adjacently disposed cells filled with the image forming medium and the dispersing fluid. The top surface of the image forming member is generally transparent or translucent so that images can be formed on the image forming surface when a magnetic image forming device, for example, the pen 51, the stamp 52 and the roller 53, is contiguously moving on the image forming surface and attracting the magnetic image forming powder.

The image or display appearing on the magnetic image forming surface can be erased by using an image erasing means. The image erasing means 40 generally includes a magnetic image eraser 41 with a magnetic surface for attracting or repelling the magnetic image forming medium. For example, the magnetic eraser may include a magnetic wiping means with the same magnetic polarity with the magnetic powder so that, by sliding the magnetic surface on the image forming surface, the magnetic image forming powder will be repelled away from the image forming surface 32. On the other hand, the magnetic image forming powder may have an opposite or compatible magnetic polarity with the image wiping surface of the magnetic image eraser 41 so that the magnetic image forming powder will be attracted away from the image forming surface 32.

In the present example, the magnetic image eraser 41 includes an elongated magnetic member which is mounted on a non-magnetic mounting frame. The elongated magnetic member extends between the two edges of the image forming member and are movable between the two extreme ends. By moving the magnetic member from one extreme and to the other, the whole of the image forming surface is covered and a temporary image formed on the image forming surface through gathering of the magnetic photoabsorptive powder near the top surface of the image forming member 31 will be attracted to the bottom 34 of the image forming member 31, thereby erasing the temporary magnetic image.

The image erasing means 40, including the magnetic member and the mounting frame, is mounted to the main housing and underneath the image forming member so that the magnetic member is closely adjacent to the bottom 34 of the image forming member 31. Furthermore, the mounting frame may be movable beyond the image forming member 31 so that the entire image forming surface can be utilized without any part being adversely undersirably by the image erasing means 40.

The image erasing means 40 is connected to the motion generating means 60 and the movement control means 70 so that the magnetic image eraser 41 can be driven by motorized means in response to control signals actuated by a user through interaction with the movement control means. The motion generating means 60 include a motorized driving mechanism which includes a motor 61 and a set of geared transmission link 62. The motor 61 and the geared transmission link are mounted within a housing so that the entire motion generation means 60 is connected to the mounting member of the image erasing means 40 and downwardly depending therefrom.

In addition, a rack 25 which is generally parallel to one of the edges of the image forming member 31 is mounted on the underside of the top housing so that the output pinion 63 of the motion generating means 60 can engage the teeth on the rack to cause relative movement between the image erasing means 40 and the image forming member 31 to effect image erasure. The motion indication means 80, which includes a physical indicia such as a train Figure 81, is also connected to the image erasing means 40. Due to this connection, the visible indicia 80 will move in synchronization with the image erasing means 40. The visible indicia 80 can be an article which is indicative, representative or characteristic of an object so that interesting or remarkable visual effects can be generated together with the otherwise monotonous movement of an ordinary image erasing means. The visual indicia or object is preferably indicative, representative or characteristic of an object, even better a moving object, such as a train, a car, or ship, animals or even a ball, to make the operation of the erasing means more lively and attractive to a user.

To provide additional visual effects, the orientation of the visual indicia 80 can be changed or reversed at each extreme and of the path of motion, i.e., the track 25, so that the conventional or ordinary orientation of movement of the object can be maintained. This can be done, for example, by means of a cam arrangement at the ends of the rack 25.

To provide further useful and interesting features, an audible signal generating means is also included. The audible signal generator includes a means for generating audible sound which can be played during the movement of the moving object visual indicia. The sound generator may include electronic sound generating circuitry and a speaker.

In particular, the playing of the recorded sound by the audible signal generating means may be in synchronization of the moving object and the sound can be indicative, representative or characteristic of the moving object. For example, for the present example of a steam train as the moving object visual indicia, the characteristic moving sound and whistle of the train can be played during the movement of the image erasing means. Of course, other sound, such as speeches, songs, or music can be played and the playing need not be in synchronized.

To actuate the image erasing means, and therefore the moving object 80 and the playing of the recorded characteristic sound, actuation means with user interface is provided on the main housing. The actuation means in this example includes a left 83 and a right 84 motion control button so that the moving object 80 will move along a prescribed direction according to the button selected and pressed. Of course, other actuation means or user interface such as a control stick or a toy steering wheel can be mounted on the main housing 20 as the actuation means and user interface. By activating the image erasing means through the user interface such as the control button (83,84) or a steering wheel, the moving object visual indicia 80 and the associated characteristic sound can also be activated, thereby providing interactive features which are useful and interesting to attract users. To provide synchronization between the image erasing means, the moving object visual indicia and the sound generating means, they may be connected together or simultaneously actuated in response to the depressing of the selected button. Alternatively, the motion generating means and the sound generating means can be actuated by the movement of the image erasing means.

To use the magnetic image forming apparatus, a picture or an image is formed on the image forming surface of the image forming member by moving the magnetic pen or the image forming drum on the image forming member or by placing the magnetic stamps on the image forming surface. When it is desirable to erase the images, the image erasing means can be actuated by selective activation or depression of one of the two control buttons. With the depression of the selected button, the motion generating means and the sound generating means will be activated and the associated movements and sound will be generated to produce the interactive features which are useful and attractive to a user.

While the present invention has been explained by reference to the preferred embodiments described above, it will be appreciated that the embodiments are only illustrated as examples to assist understanding of the present invention and are not meant to be restrictive on its scope. In particular, the scope, ambit and spirit of this invention are meant to include the general principles of this invention as inferred or exemplified by the embodiments described above. More particularly, variations or modifications which are obvious or trivial to persons skilled in the art, as well as improvements made on the basis of the present invention, should be considered as falling within the scope and boundary of the present invention.

Furthermore, while the present invention has been explained by reference to a toy drawing board, it should be appreciated that the invention can apply, whether with or without modifications, to other image forming or drawing apparatuses without loss of generality.

What is claimed is:

1. A magnetic drawing apparatus including image forming means, image erasing means, motion generating means, movement control means, visible motion indication means and a main housing, wherein:

said image forming means include a plurality of magnetic cells which collectively define an image forming surface, said magnetic cells containing a viscous fluid and magnetic powder;

said image erasing means include a magnetic image eraser which is adjacent to said image forming means, said magnetic image eraser being connected to said motion generating means and movable relative to said image forming means to erase an image on said image forming means;

said motion indication means is movable in synchronization with said magnetic image eraser; and said movement control means include means for actuating and controlling said motion generating means to erase an image.

2. A magnetic drawing apparatus of claim 1, wherein said movement control means include means for selecting the direction of movement of said magnetic image eraser with respect to said image forming means.

3. A magnetic drawing apparatus of claim 1, further including an audible sound generating means which generates audible sound during the movement of said magnetic image eraser.

4. A magnetic drawing apparatus of claim 3, wherein said motion indication means includes a visible indicia which is indicative, representative or characteristic of an object, the audible sound generated by said audible signal generating means being indicative, representative or characteristic of said object.

5. A magnetic drawing apparatus of claim 4, wherein said object includes a vehicle such as a train, said audible sound being the characteristic sound associated with the movement of said vehicle.

6. A magnetic drawing apparatus of claim 1, wherein said visible motion indication means includes a visible indicia of an object which has a commonly recognized direction of movement with reference to a direction indicator of said visible indicia, said visible indicia being movable along a pre-defined track formed on said main housing.

7. A magnetic drawing apparatus of claim 6, further including means for changing the orientation of said direction indicator at the extremes of said track.

8. A magnetic drawing apparatus of claim 6, wherein said movement control means include means for selectively changing the direction of movement of said magnetic image eraser along said track when said visible indicia is located intermediate between the ends of said track.

9. A magnetic drawing apparatus of claim 1, wherein said motion generating means include a motorized driving mechanism, said motorized driving mechanism includes a motor and a set of geared transmission link, said magnetic image eraser being mounted with said motorized driving mechanism and said geared transmission link being engageable with said main housing so that motion of the motor will be translated into movements of said magnetic image eraser through engagement between said transmission link and said main housing.

10. A magnetic drawing apparatus of claim 1, wherein said movement control means include a user control interface which is visible and accessible to a user for user control and selection of the movement of said magnetic image eraser.

11. A magnetic drawing apparatus of claim 10, wherein said user control interface includes means to control the duration of movement of said magnetic image eraser.

12. A toy drawing board including image forming means, image erasing means, motion generating means, motion indication means, sound generation means, movement control means and a main housing, wherein:

said image forming means include a plurality of magnetic cells which collectively define an image forming surface, said magnetic cells containing viscous fluid and magnetic powder;

said image erasing means include a magnetic image eraser which is adjacent to said image forming means, said magnetic image eraser being connected to said motion generating means and movable relative to said image forming means;

said motion indication means includes a visible indicia which is indicative, representative or characteristic of an object, the audible sound generated by said sound generating means being indicative, representative or characteristic of said object;

said sound generation means generates audible sound during the movement of said magnetic image eraser; and said movement control means include means for actuating said motion generating means and means for selecting the direction of movement of said magnetic image eraser with respect to said image forming means.

13. A toy drawing board according to claim 12, wherein said motion indication means is movable in synchronization with said magnetic image eraser.

14. A toy drawing board according to claim 12, further including a steering wheel for controlling the direction of movement of said image eraser.

15. A toy drawing board according to claim 12, further including an image forming device, said image forming device includes a cylindrical drum with image forming magnetic patterns formed on the curved cylindrical surface of said drum.

16. A toy drawing board according to claim 15, wherein said image forming device further includes a handle with a shaft for engaging and driving the rotation of said drum.

* * * * *